US012785165B2

(12) United States Patent
Fukutome et al.

(10) Patent No.: US 12,785,165 B2
(45) Date of Patent: Nov. 3, 2026

(54) BATTERY PACK AND METHOD FOR PRODUCING SAME

(71) Applicant: SANYO Electric Co., Ltd., Daito (JP)

(72) Inventors: Kazuaki Fukutome, Hyogo (JP); Hiroshi Arikawa, Osaka (JP)

(73) Assignee: PANASONIC ENERGY CO., LTD., Osaka (JP)

(*) Notice: Subject to any disclaimer, the term of this patent is extended or adjusted under 35 U.S.C. 154(b) by 1198 days.

(21) Appl. No.: 16/968,979

(22) PCT Filed: Feb. 8, 2019

(86) PCT No.: PCT/JP2019/004526
§ 371 (c)(1),
(2) Date: Aug. 11, 2020

(87) PCT Pub. No.: WO2019/163549
PCT Pub. Date: Aug. 29, 2019

(65) Prior Publication Data

US 2021/0057690 A1 Feb. 25, 2021

(30) Foreign Application Priority Data

Feb. 22, 2018 (JP) ................................ 2018-029803

(51) Int. Cl.
*H01M 10/625* (2014.01)
*H01M 10/0525* (2010.01)
(Continued)

(52) U.S. Cl.
CPC ..... *H01M 10/613* (2015.04); *H01M 10/0525* (2013.01); *H01M 10/625* (2015.04);
(Continued)

(58) Field of Classification Search
CPC ............. H01M 10/613; H01M 10/625; H01M 10/643; H01M 10/6551; H01M 50/291;
(Continued)

(56) References Cited

U.S. PATENT DOCUMENTS

2011/0236740 A1* 9/2011 Paolazzi ............. H01M 10/613 429/151
2016/0006005 A1 1/2016 Sakakibara
(Continued)

FOREIGN PATENT DOCUMENTS

CN 102005601 A * 4/2011 .......... H01M 10/613
CN 102195010 A 9/2011
(Continued)

OTHER PUBLICATIONS

Haruhiko et al., machine translation of CN 102005601, Apr. 6, 2011 (Year: 2011).*
(Continued)

*Primary Examiner* — Ula C Ruddock
*Assistant Examiner* — Olivia Mason Melfi
(74) *Attorney, Agent, or Firm* — WHDA, LLP

(57) ABSTRACT

A battery pack includes a plurality of secondary battery cells, a battery holder, a circuit substrate, and an outer case, in which the battery holder is divided into a plurality of divided holders, each of the divided holders forms a fitting structure for fitting the divided holders to each other at an interface for joining the divided holders together, the battery holder forms a substrate holding area that holds a circuit substrate with the circuit substrate surrounded by side walls in a state where the divided holders are coupled to each other by the fitting structure, a joint interface where the divided holders are fitted to each other by the fitting structure of the divided holders is exposed in the substrate holding area, and
(Continued)

a surface of the circuit substrate is covered with a potting resin in the substrate holding area.

20 Claims, 10 Drawing Sheets

(51) Int. Cl.

| | |
|---|---|
| ***H01M 10/613*** | (2014.01) |
| ***H01M 10/643*** | (2014.01) |
| ***H01M 10/6551*** | (2014.01) |
| ***H01M 50/213*** | (2021.01) |
| ***H01M 50/291*** | (2021.01) |

(52) U.S. Cl.
CPC ..... *H01M 10/643* (2015.04); *H01M 10/6551* (2015.04); *H01M 50/213* (2021.01); *H01M 50/291* (2021.01); *H01M 2220/20* (2013.01)

(58) Field of Classification Search
CPC ........... H01M 50/213; H01M 10/0525; H01M 2220/20
See application file for complete search history.

(56) References Cited

U.S. PATENT DOCUMENTS

| | | | | |
|---|---|---|---|---|
| 2016/0111692 A1* | 4/2016 | Morita | ................ | H01M 50/209 429/96 |
| 2017/0155104 A1 | 6/2017 | Yoneda et al. | | |

FOREIGN PATENT DOCUMENTS

| | | | | | |
|---|---|---|---|---|---|
| CN | 105322608 | A | | 2/2016 | |
| EP | 2290728 | A1 | * | 3/2011 | .......... H01M 50/289 |
| EP | 2439810 | A2 | | 4/2012 | |
| EP | 2355205 | B1 | * | 11/2012 | .......... H01M 2/1077 |
| EP | 2290731 | B1 | * | 10/2016 | .......... H01M 50/262 |
| EP | 2911215 | B1 | * | 11/2016 | .......... H01M 50/502 |
| JP | 2011-049012 | A | | 3/2011 | |
| JP | 2011-181415 | A | | 9/2011 | |
| JP | 2012079547 | A | * | 4/2012 | .......... H01M 10/425 |
| WO | 2015/063994 | A1 | | 5/2015 | |
| WO | 2016/006143 | A1 | | 1/2016 | |
| WO | 2017/110036 | A1 | | 6/2017 | |

OTHER PUBLICATIONS

International Search Report dated Apr. 2, 2019, issued in counterpart Application No. PCT/JP2019/004526. (1 page).
English Translation of Office Action dated Mar. 23, 2022, issued in counterpart CN Application No. 201980012644.3. (4 pages).

* cited by examiner

BATTERY PACK AND METHOD FOR PRODUCING SAME

TECHNICAL FIELD

The present invention relates to a battery pack and a method for producing the battery pack.

BACKGROUND ART

A battery pack in which a plurality of secondary battery cells is connected in series or in parallel to increase output and a capacity is used as a power source for an assisted bicycle, an electric tool, and the like. In such a battery pack, a plurality of secondary battery cells is housed in an outer case while housed in a battery holder. Furthermore, a circuit substrate on which a charging and discharging circuit, a protection circuit, and the like for the secondary battery cells are mounted is provided to the battery holder (for example, PTL 1).

In such a circuit substrate, a surface has been covered by potting from viewpoints of enhancing heat radiation, waterproofing, measures against foreign matters, and the like. In order to perform such potting, the circuit substrate is provided with substrate holder 91 for housing the circuit substrate as illustrated in an exploded perspective view of FIG. 10A, liquid resin 93 is filled and cured in a state where circuit substrate 90 is housed in substrate holder 91 as illustrated in FIG. 10B, and then substrate holder 91 is placed on battery holder 94 as illustrated in FIG. 10C, to obtain a battery pack as illustrated in FIG. 10D.

However, this configuration has a problem in that a number of parts is increased since the battery holder and the substrate holder are required, and a structure for fixing the substrate holder on the battery holder and a fixing work such as screwing for fixing the substrate holder on the battery holder are required.

CITATION LIST

Patent Literature

PTL 1: WO2016/006143 A

SUMMARY OF THE INVENTION

The present invention has been made in view of such a background, and an object of the present invention is to provide a battery pack capable of implementing a configuration for improving heat radiation of a circuit substrate with a potting resin, with a simpler configuration.

According to a battery pack of a first aspect of the present invention, the battery pack includes a plurality of secondary battery cells connected to each other in series and/or in parallel, a battery holder that holds the plurality of secondary battery cells, a circuit substrate connected to the plurality of secondary battery cells, and an outer case that houses the battery holder inside, in which the battery holder is divided into a plurality of divided holders, each of the divided holders forms a fitting structure for fitting the divided holders to each other at an interface for joining the divided holders together, the battery holder forms a substrate holding area that holds the circuit substrate with the circuit substrate surrounded by side walls in a state where the divided holders are coupled to each other by the fitting structure, a joint interface where the divided holders are fitted to each other by the fitting structure of the divided holders is exposed in the substrate holding area, and a surface of the circuit substrate may be covered with a potting resin in the substrate holding area. With the above configuration, providing the fitting structure at the joint interface between the divided holders so that the substrate holding area can be filled with the potting resin makes it possible to hold the circuit substrate in the substrate holding area without separately preparing a substrate holder that is a separate member different from the battery holder, unlike a conventional case.

Furthermore, according to a battery pack of a second aspect of the present invention, in addition to the above configuration, the battery holder may be made of a hard resin.

Furthermore, according to a battery pack of a third aspect of the present invention, in addition to any of the above configurations, the fitting structure may be a spigot structure. With the above configuration, it is possible to reduce a gap at the joint interface that joins the divided holders together and to fill the substrate holding area with the potting resin having a certain degree of viscosity.

Furthermore, according to a battery pack of a fourth aspect of the present invention, in addition to any of the above configurations, the fitting structure may include groove portions that are formed at a joint interface of one of the divided holders and separated from each other, and insertion portions that are formed on a joint interface of the other divided holder and press-fitted into the groove portions. With the above configuration, it is possible to reduce the gap at the joint interface and to prevent the potting resin from leaking with a relatively simple structure.

Furthermore, according to a battery pack of a fifth aspect of the present invention, in addition to any of the above configurations, a pair of sandwiching portions that are separated to form the groove portion may be formed to each have substantially same thickness.

Furthermore, according to a battery pack of a sixth aspect of the present invention, in addition to any of the above configurations, the substrate holding area is formed in a rectangular shape in a plan view, and the joint interface between the divided holders may be located along a longitudinal direction of the rectangular shape.

Furthermore, according to a battery pack of a seventh aspect of the present invention, in addition to any of the above configurations, the battery holder may be divided into two parts at substantially a center. With the above configuration, dividing the battery holder into two halves having substantially the same volume makes it possible to obtain an advantage that the divided holders can be made substantially equal in thickness, and composite molding with one mold is facilitated.

Furthermore, according to a method for producing a battery pack of an eighth aspect of the present invention, the battery pack includes a plurality of secondary battery cells connected to each other in series or in parallel, a battery holder that holds the plurality of secondary battery cells, a circuit substrate connected to the plurality of secondary battery cells, and an outer case that houses the battery holder inside. The method may include sandwiching the plurality of secondary battery cells to hold the plurality of secondary battery cells in a state where the battery holder is divided into a plurality of divided holders, coupling the divided holders by a fitting structure for fitting the divided holders to each other to form the battery holder, the fitting structure being formed at an interface for joining the divided holders together, and forming a substrate holding area that holds the circuit substrate on an upper surface of the battery holder and in which a joint interface where the divided holders are fitted to each other by the fitting structure of the divided holders is exposed, holding the circuit substrate in the substrate holding area with the circuit substrate surrounded by side walls, covering a surface of the circuit substrate with a potting resin to cure the potting resin in the substrate holding area, and housing the battery holder in the outer case. With this configuration, providing the fitting structure at the joint interface between the divided holders so that the substrate holding area can be filled with the potting resin makes it possible to hold the circuit substrate in the substrate holding area even if a substrate holder that is a separate member different from the battery holder is not separately prepared, unlike a conventional case.

BRIEF DESCRIPTION OF DRAWINGS

FIG. 7 is an exploded perspective view in which the battery holder in

FIG. 6 is divided into two parts.

DESCRIPTION OF EMBODIMENT

Figure 1:
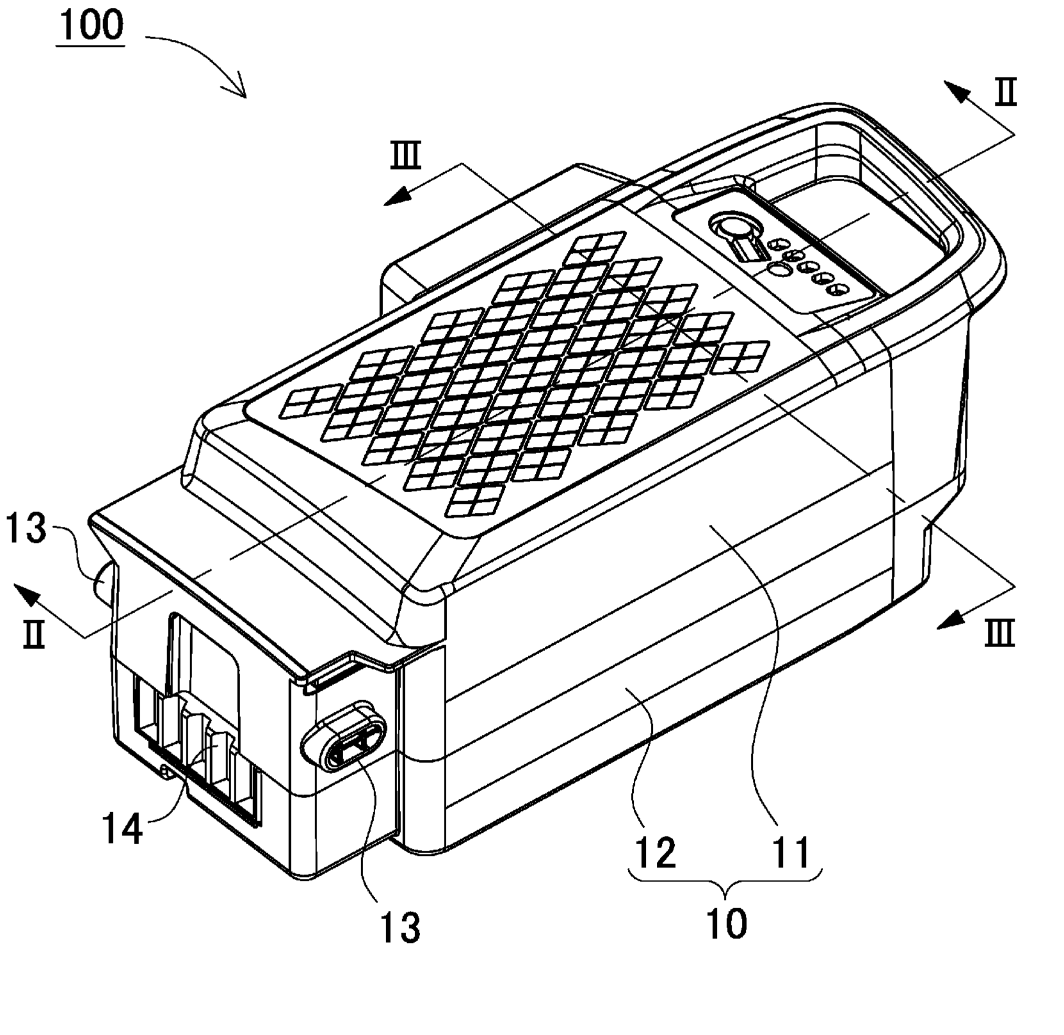
FIG. 1 is a perspective view illustrating a battery pack according to a first exemplary embodiment of the present invention.

Hereinafter, an exemplary embodiment of the present invention will be described with reference to the drawings. However, the exemplary embodiment described below is an example for embodying the technical idea of the present invention, and the present invention is not limited to the following. Furthermore, in the present specification, members shown in the claims are not limited to members in the exemplary embodiment. Especially, sizes, materials, and shapes of components and relative arrangement between the components, which are described in the exemplary embodiment, do not limit the scope of the present invention but are simply description examples as long as there is no specific description in particular. Note that the sizes and positional relationships of members illustrated in the drawings are sometimes exaggerated for clarity of description. Furthermore, in the following description, the same names and reference numerals indicate the same or similar members, and detailed description thereof will be appropriately omitted. Furthermore, regarding each element constituting the present invention, a plurality of elements may be formed of the same member, and one member may serve as the plurality of elements. Conversely, a function of one member may be shared by a plurality of members to be implemented.

First Exemplary Embodiment

Figure 2:
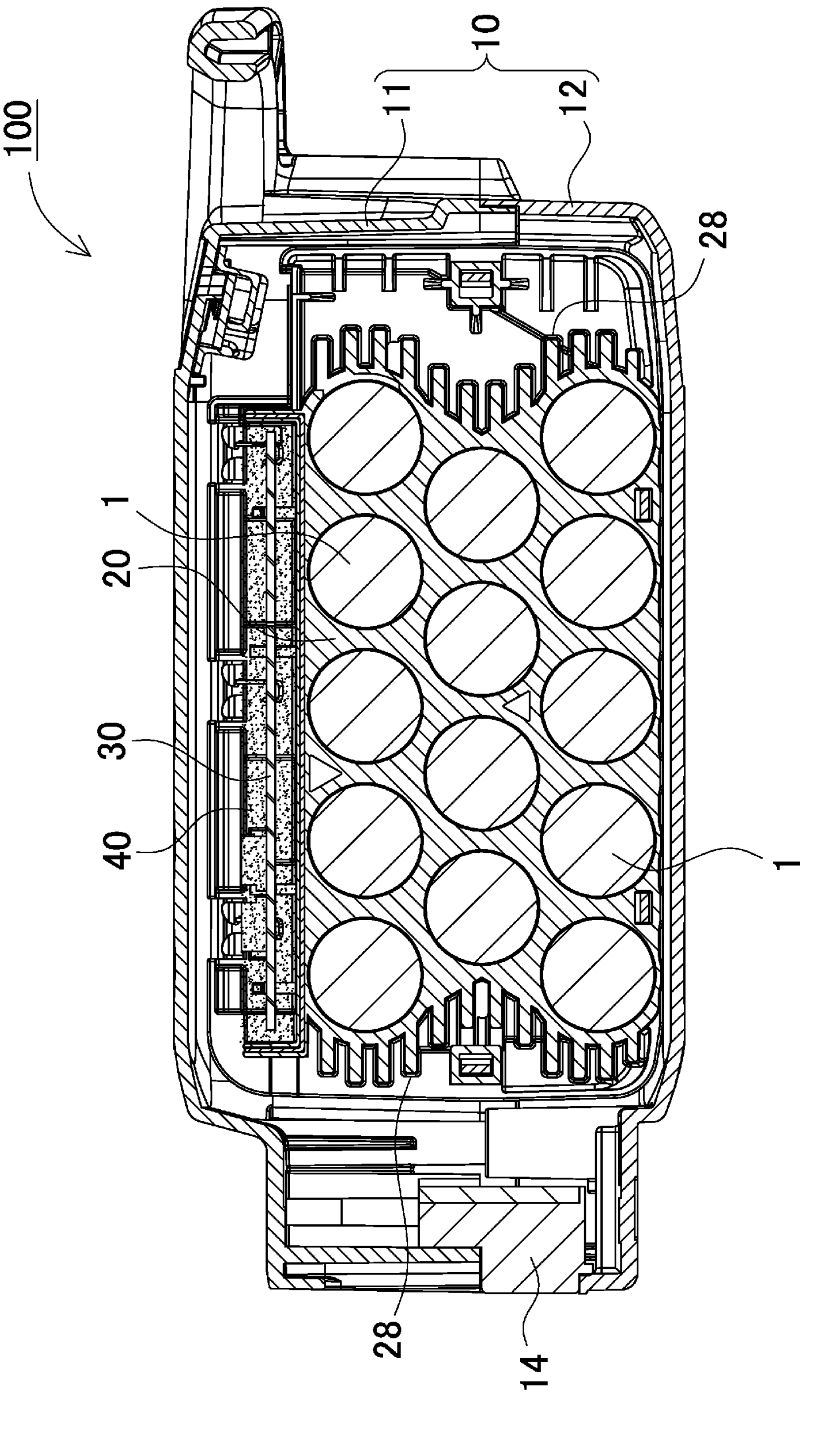
FIG. 2 is a sectional view taken along line II-II in FIG. 1.
Figure 3:
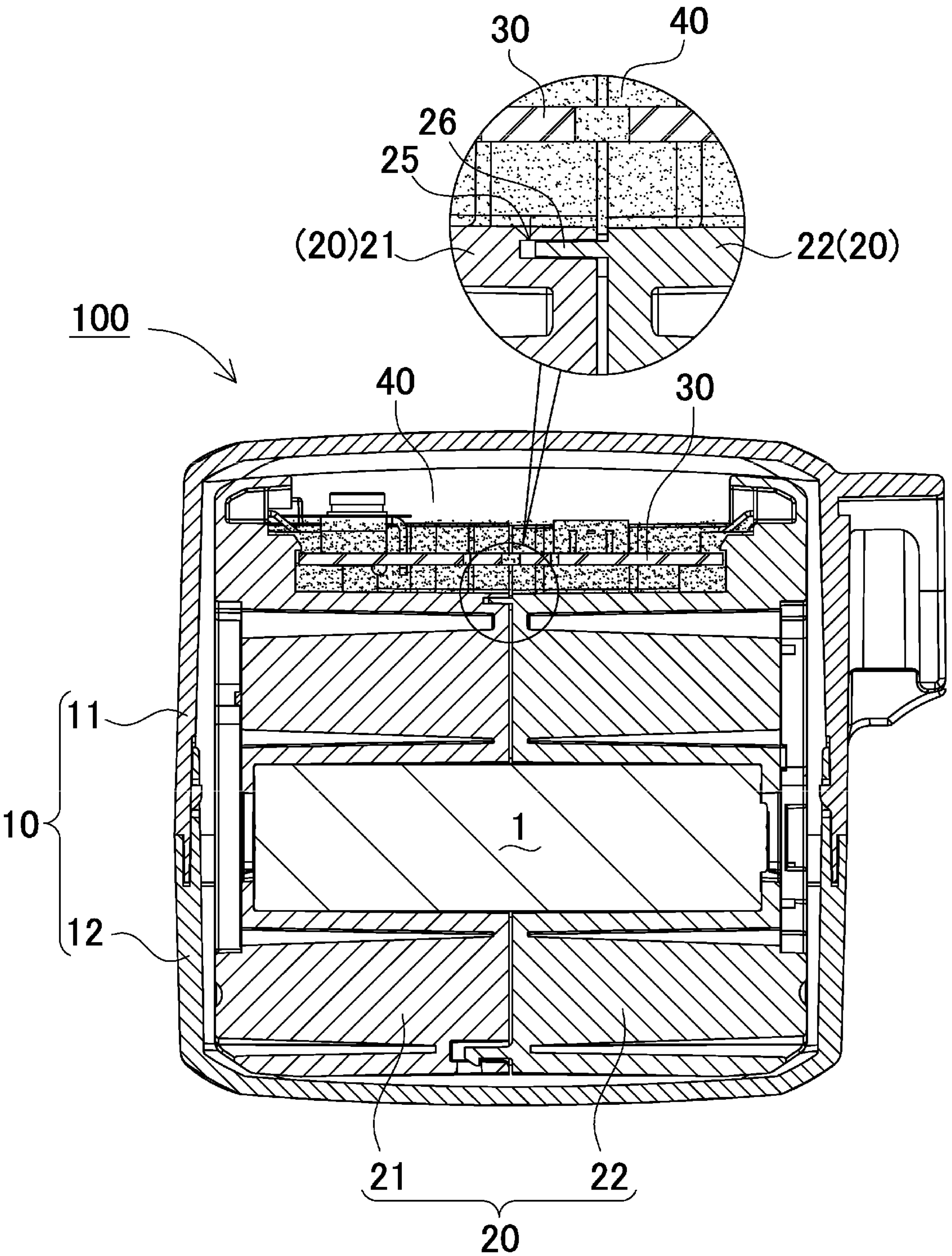
FIG. 3 is a sectional view taken along line III-III in FIG. 1.
Figure 4:
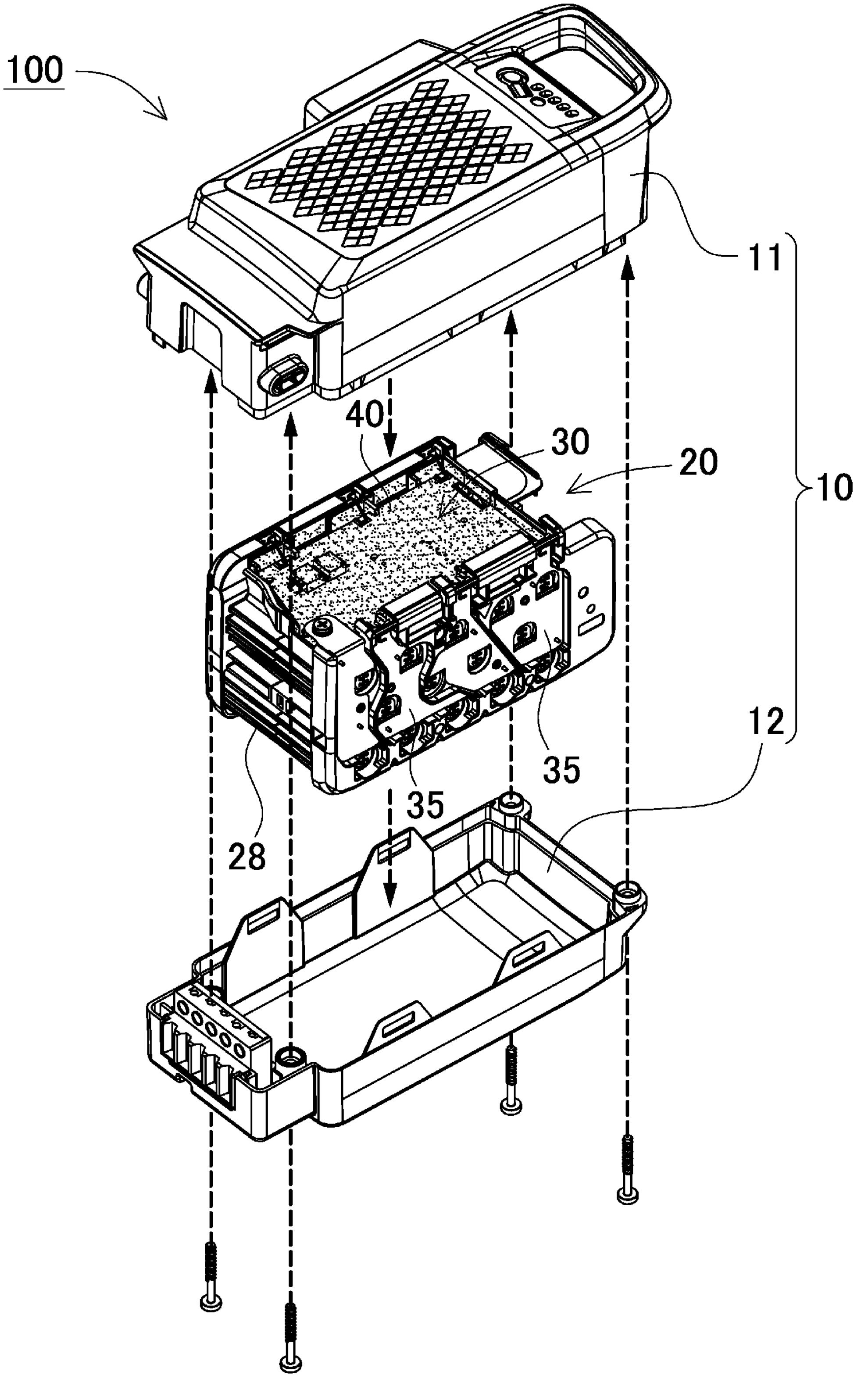
FIG. 4 is an exploded perspective view of the battery pack in FIG. 1 with an outer case removed.
Figure 5:
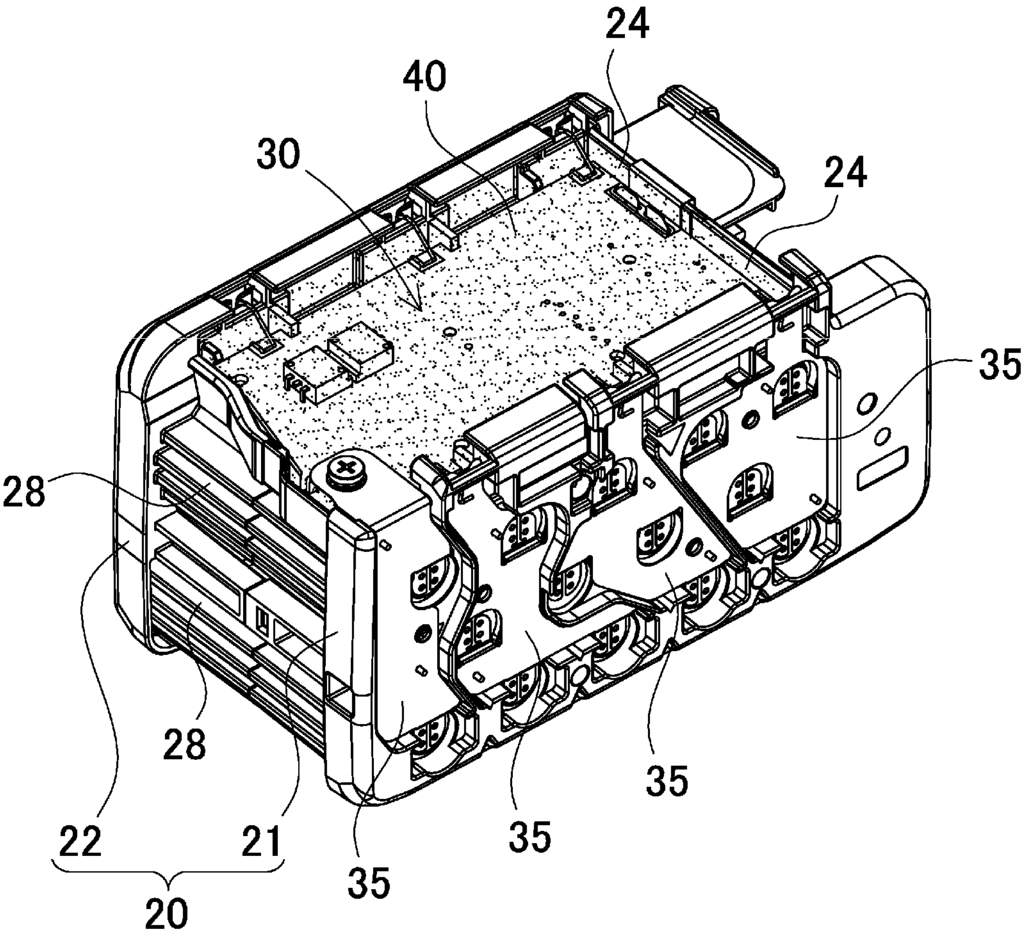
FIG. 5 is a perspective view of a battery holder in FIG. 4.
Figure 6:
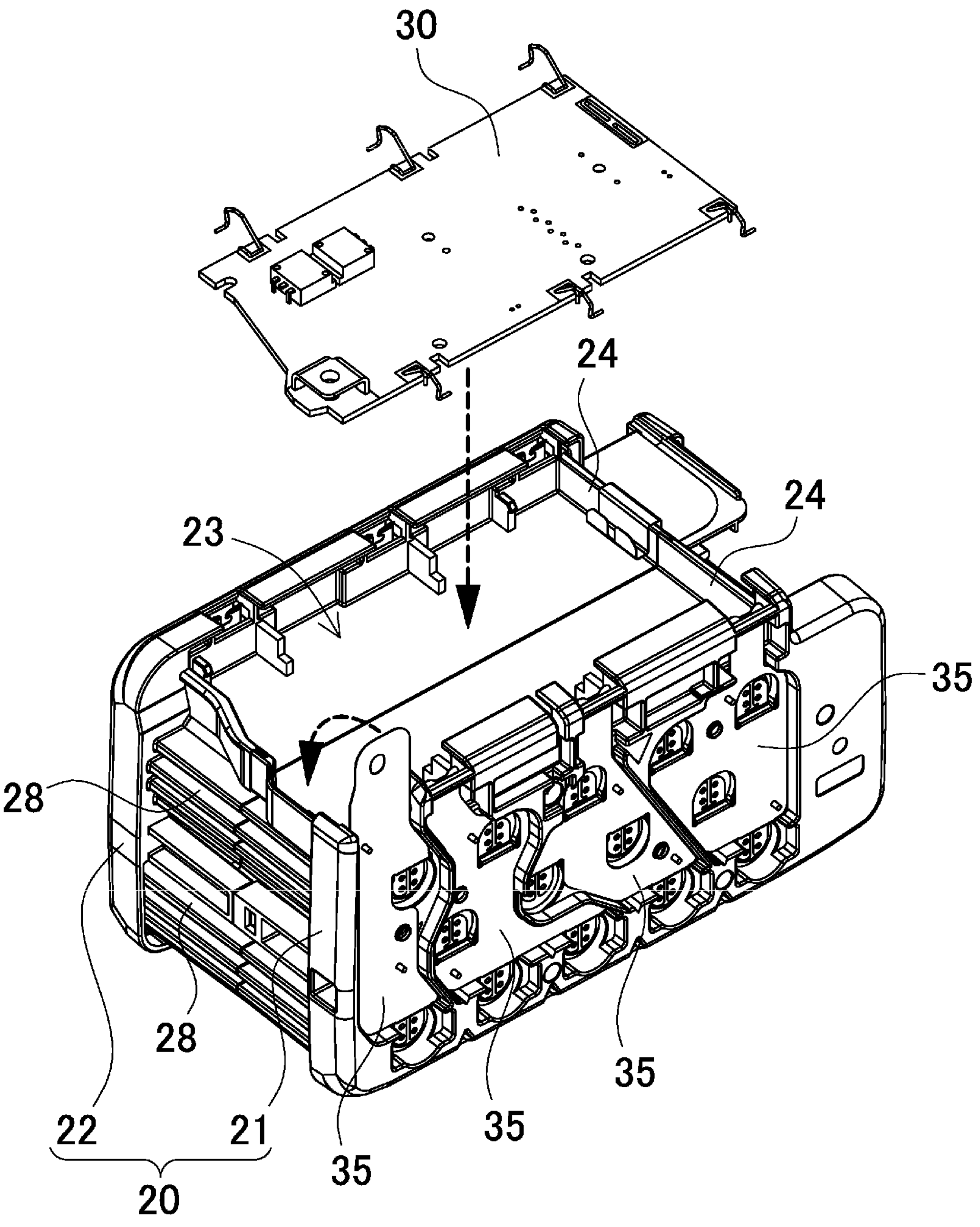
FIG. 6 is an exploded perspective view illustrating a state where a circuit substrate is removed from the battery holder in FIG. 5.
Figure 7:
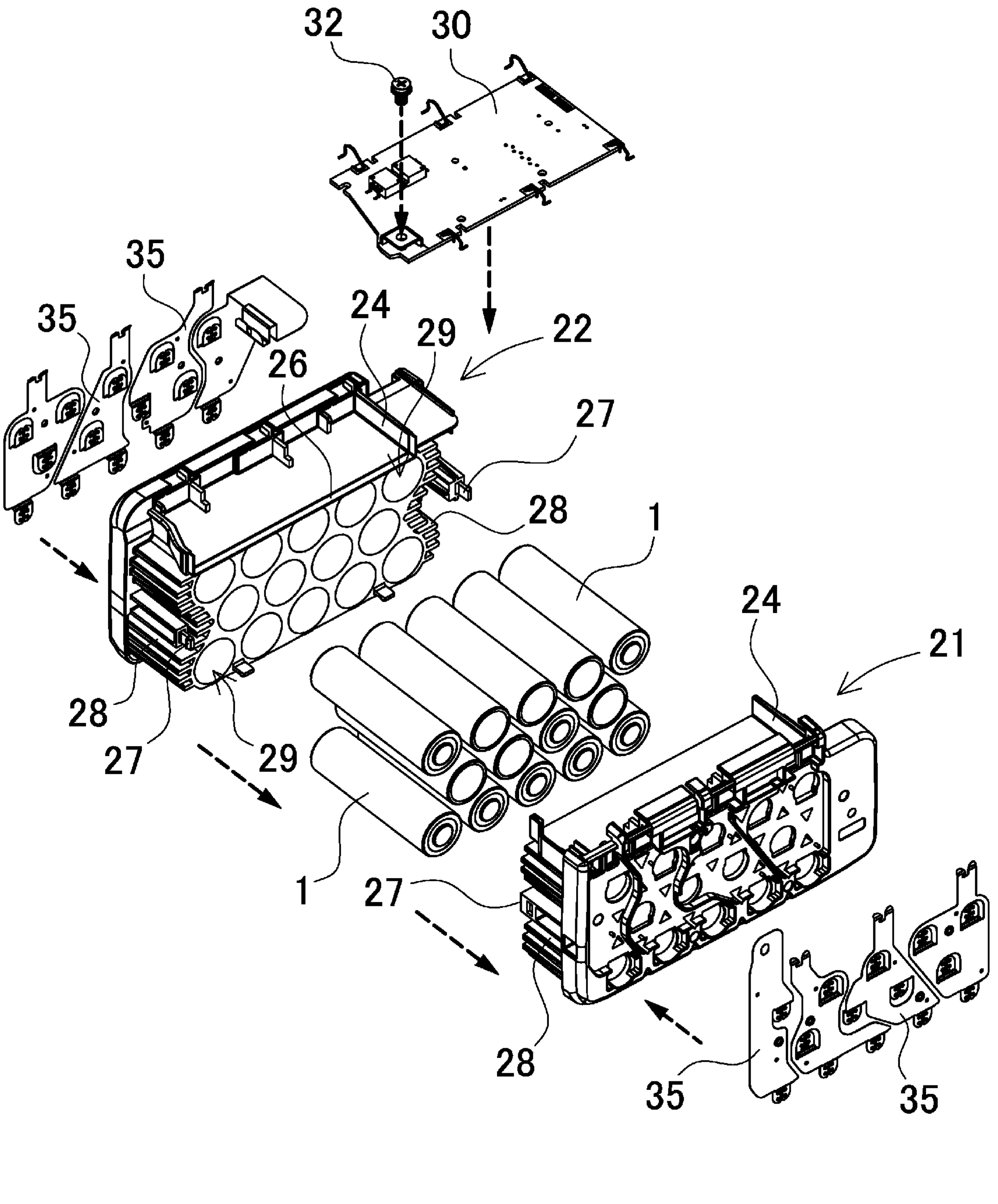
Figure 8:
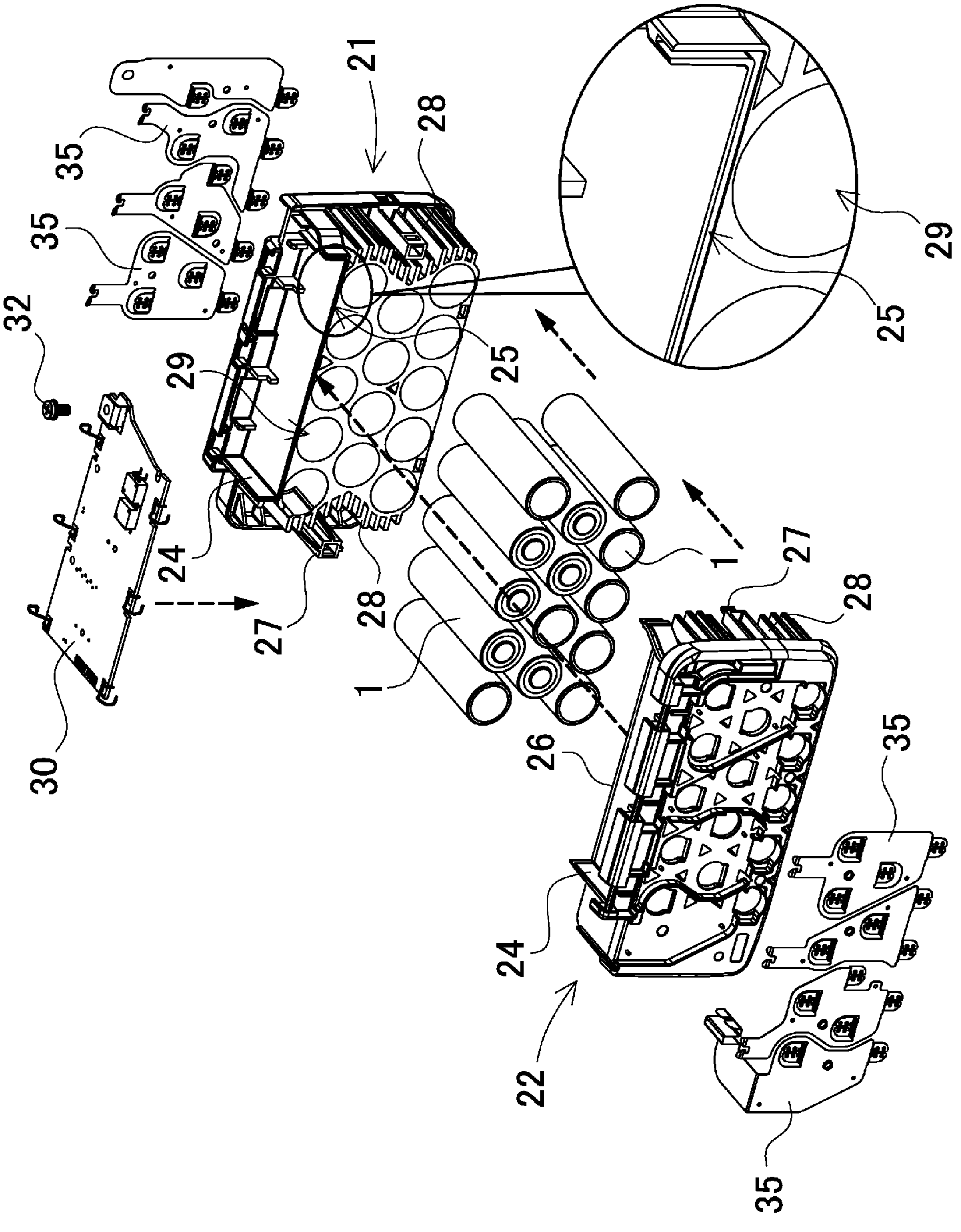
FIG. 8 is an exploded perspective view of the battery holder in FIG. 7 viewed from a back side.

A battery pack according to a first exemplary embodiment of the present invention is illustrated in FIGS. 1 to 8. In these figures, FIG. 1 is a perspective view illustrating battery pack 100 according to the first exemplary embodiment of the present invention, FIG. 2 is a sectional view taken along line II-II in FIG. 1, FIG. 3 is a sectional view taken along line III-III in FIG. 1, FIG. 4 is an exploded perspective view of battery pack 100 in FIG. 1 with outer case 10 removed, FIG. 5 is a perspective view of battery holder 20 in FIG. 4, FIG. 6 is an exploded perspective view illustrating a state where circuit substrate 30 is removed from battery holder 20 in FIG. 5, FIG. 7 is an exploded perspective view in which battery holder 20 in FIG. 6 is divided into two parts, and FIG. 8 is an exploded perspective view of battery holder 20 in FIG. 7 viewed from a back side. Battery pack 100 houses a plurality of secondary battery cells 1 inside, which is connected in series or in parallel to increase a capacity, and enables charging and discharging. Battery pack 100 is connected to an external device to be driven, and secondary battery cells 1 are discharged to supply electric power. Here, the external device to which battery pack 100 is connected is an assisted bicycle, but the external device to which the battery pack of the present invention is connected is not limited to the assisted bicycle. The external device may be other electrical equipment or electronic equipment, for example, an electric tool, agricultural machinery such as a lawn mower, a brush cutter, a sprayer, a small cultivator, a hedge trimmer, and high branch pruning scissors, care and welfare equipment such as a bathing lift, electric assist equipment, auxiliary equipment, and a round-visit car, or a home electric appliance such as a portable light, a lighting device, a cleaner, a camcorder, a portable digital versatile disc (DVD) player, a portable car navigation system, a portable music player, and a laptop computer. Furthermore, the battery pack may be directly and removably attached to the external device for use, may be housed or embedded in the external device, or may be connected to the external device via a cable or the like.

Outer Case 10

Battery pack 100 is formed in a box shape with its appearance extending in one direction as illustrated in FIGS. 1 to 3. The box-shaped body includes outer case 10. Outer case 10 includes connection mechanism 13 and connector 14 for connecting outer case 10 to electrical equipment to be driven (here, the assisted bicycle) to which battery pack 100 supplies electric power. In addition, a lock mechanism for maintaining battery pack 100 in a state of being attached to the electrical equipment may be provided. Outer case 10 is made of a material having excellent insulation and thermal insulation, for example, a resin such as polycarbonate. Furthermore, as illustrated in FIGS. 2 to 4, outer case 10 is divided into upper case 11 and lower case 12, and houses battery holder 20 inside.

Battery Holder 20

Battery holder 20 has a box-like outer shape as illustrated in the perspective view of FIG. 5. Radiation fins 28 are formed on a surface of battery holder 20 to increase a surface area and enhance heat radiation. In an example shown in the sectional view of FIG. 2, the plurality of radiation fins 28 is projected in front of and behind battery holder 20 so as to be separated from each other.

Furthermore, as illustrated in the sectional views of FIGS. 2 and 3 and the exploded perspective view of FIG. 6, circuit substrate 30 is held on an upper surface of battery holder 20. In addition, as illustrated in the exploded perspective view of FIG. 7, battery holder 20 holds the plurality of secondary battery cells 1. Moreover, circuit substrate 30 is held on the upper surface of battery holder 20.

Battery holder 20 is divided into left and right parts in order to hold secondary battery cells 1. Battery holder 20 includes first divided holder 21 and second divided holder 22, and holds secondary battery cells 1 by sandwiching secondary battery cells 1 between first divided holder 21 and second divided holder 22.

First divided holder 21 and second divided holder 22 hold the plurality of secondary battery cells 1, lead plates 35, and the like. In this example, as secondary battery cells 1, cylindrical secondary battery cells each having a cylindrical exterior can are used. Here, 14 secondary battery cells are used, and two sets of battery rows are connected in parallel, in which seven out of the 14 secondary battery cells are connected in series. A number and a connection form of secondary battery cells can be freely changed.

Each of first divided holder 21 and second divided holder 22 is formed with a plurality of battery holding cylinders 29 for holding secondary battery cells 1, as illustrated in the exploded perspective view of FIG. 7 and the like. Each of battery holding cylinders 29 has a depth of about half a length of each of secondary battery cells 1, and secondary battery cells 1 are housed in battery holding cylinders 29 with first divided holder 21 and second divided holder 22 joined together. Furthermore, first divided holder 21 and second divided holder 22 expose end surfaces of secondary battery cells 1 from opening windows with secondary battery cells 1 inserted into battery holding cylinders 29, lead plates 35 are held on the opening windows, and lead plates 35 and the end surfaces of secondary battery cells 1 are welded together.

Furthermore, first divided holder 21 and second divided holder 22 are preferably made of hard resins having excellent insulation and heat resistance. For example, first divided holder 21 and second divided holder 22 can be made of polycarbonate or the like. With this configuration, it is possible to insulate and thermally insulate adjacent secondary battery cells 1 from each other.

Cylindrical secondary battery cells 1 are lithium ion secondary batteries. However, as the cylindrical secondary battery cells, chargeable and dischargeable secondary batteries such as nickel metal hydride batteries or nickel cadmium batteries can be used. Furthermore, secondary battery cells 1 are electrically connected in series or in parallel by lead plates 35. Metal sheets having excellent conductivity are bended to form lead plates 35. Lead plates 35 are welded to electrodes on the end surfaces of secondary battery cells 1. Furthermore, total+ and total− of a battery assembly in which secondary battery cells are connected to each other are connected to circuit substrate 30.

Circuit Substrate 30

Circuit substrate 30 is connected to the plurality of secondary battery cells 1. Circuit substrate 30 has a charging and discharging circuit and a protection circuit mounted thereon. Furthermore, to circuit substrate 30, an intermediate potential lead wire for measuring an intermediate potential may be connected in order to grasp a voltage of each secondary battery cell 1, and a potential of a temperature detector for detecting a temperature of each secondary battery cell 1 may be connected. A thermistor or the like is used for the temperature detector.

Substrate Holding Area 23

Furthermore, in order to hold circuit substrate 30, battery holder 20 has substrate holding area 23 formed on the upper surface thereof. Substrate holding area 23 holds circuit substrate 30 with circuit substrate 30 surrounded by side walls 24. Circuit substrate 30 is fixed to substrate holding area 23 by screwing or the like. Furthermore, in this state, circuit substrate 30 including a mounted semiconductor element and the like is covered with potting resin 40 so as to be embedded. As a result, even if the semiconductor element such as a field effect transistor (FET) used as a charging and discharging circuit generates heat, the heat is thermally conducted and radiated by potting resin 40.

Substrate holding area 23 is integrally formed with battery holder 20, and thus it is possible to eliminate need to prepare, as a separate member, a substrate holder for holding the substrate, which has been conventionally required.

Each of the divided holders has a fitting structure for fitting the divided holders to each other at an interface where the divided holders are joined together. The divided holders are coupled to each other by this fitting structure to form substrate holding area 23. Furthermore, substrate holding area 23 is formed in a rectangular shape in a plan view, and the joint interface between the divided holders is located along a longitudinal direction of the rectangular shape.

In substrate holding area 23, the joint interface where the divided holders are fitted to each other by the fitting structure of the divided holders is exposed. Furthermore, with circuit substrate 30 arranged in substrate holding area 23, a surface of circuit substrate 30 is covered with potting resin 40. With this arrangement, providing the fitting structure at the joint interface between the divided holders so that substrate holding area 23 can be filled with potting resin 40 makes it possible to hold circuit substrate 30 in substrate holding area 23 even if a substrate holder that is a separate member different from battery holder 20 is not separately prepared, unlike a conventional case.

Fitting Structure

The fitting structure for fitting first divided holder 21 and second divided holder 22 at the joint interface is preferably a fitting type spigot (inlay) structure as illustrated in FIGS. 3, 7, and the like. With this arrangement, it is possible to reduce a gap at the joint interface that joins the divided holders together and to fill substrate holding area 23 with potting resin 40 having a certain degree of viscosity.

Groove Portion 25, Insertion Portion 26

As the fitting structure of the spigot (inlay) structure as described above, in the example illustrated in FIGS. 7 and 8, groove portion 25 is formed on the joint interface of first divided holder 21, and insertion portion 26 is formed on the joint interface of second divided holder 22. Groove portion 25 is formed between a pair of sandwiching portions that are separated from each other at a constant interval on the joint interface of first divided holder 21. Insertion portion 26 is press-fitted into groove portion 25 so that first divided holder 21 and second divided holder 22 are fitted. Groove portion 25 and insertion portion 26 are formed in such a size that insertion portion 26 can be press-fitted into groove portion 25 to be fitted therein. Furthermore, as illustrated in the sectional view of FIG. 2 and the like, the joint interface between first divided holder 21 and second divided holder 22 is formed in a substantially U-shape in cross section, and the fitting structure is also formed in a substantially U-shape along the joint interface. With this configuration, it is possible to reduce the gap at the joint interface and to prevent potting resin 40 from leaking with a relatively simple structure. It is preferable that the pair of sandwiching portions each have substantially the same thickness.

Furthermore, it is preferable that battery holder 20 is divided into two parts at substantially a center. With this configuration, first divided holder 21 and second divided holder 22 have substantially the same size except for a protruding amount of insertion portion 26, so that molds for first divided holder 21 and second divided holder 22 can be made small as compared with a case where battery holder 20 is integrally formed. In addition, it is possible to obtain an advantage of facilitating composite molding with one mold, and handling small lots and reducing a production cost, for example, reducing a number of molds are expected.

Method for Producing Battery Pack 100

Next, a method for producing battery pack 100 will be described with reference to FIGS. 9A to 9D. First, as illustrated in FIG. 9A, cylindrical secondary battery cells 1 are inserted into battery holding cylinders 29 of one of the divided holders (second divided holder 22 in the example of FIG. 9A) so that secondary battery cells 1 are sandwiched between first divided holder 21 and second divided holder 22. In this state, since about a half of each of secondary battery cells 1 is exposed, the other divided holder (first split holder 21 in the example of FIG. 9A) is overlaid, exposed secondary battery cells 1 are covered with battery holding cylinders 29, and then first divided holder 21 and second divided holder 22 are coupled. The joint interface between first divided holder 21 and second divided holder 22 is fitted by the fitting structure. That is, insertion portion 26 of second divided holder 22 is press-fitted into groove portion 25 formed at the joint interface of first divided holder 21 to be fitted in groove portion 25. Furthermore, coupling between first divided holder 21 and second divided holder 22 is performed by locking with connecting claws 27 as illustrated in FIG. 9A. However, another double row structure such as screwing may be used. Furthermore, the end surfaces of secondary battery cells 1 are welded to lead plates 35 held by battery holder 20. Thus, as illustrated in FIG. 9B, substrate holding area 23 is formed on the upper surface of battery holder 20.

Figure 9C:
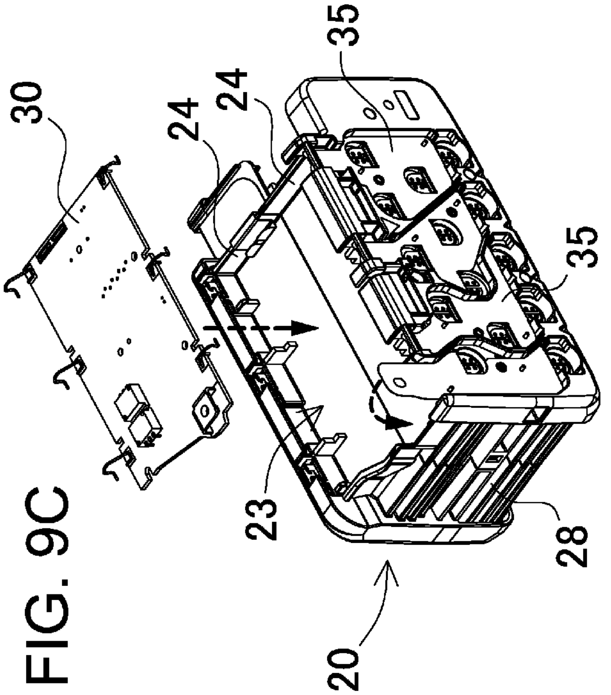
FIG. 9C is an exploded perspective view illustrating a state where the circuit substrate is placed from the state in FIG. 9B.

Next, as illustrated in FIG. 9C, circuit substrate 30 is placed and fixed on substrate holding area 23. Here, as illustrated in FIG. 7, circuit substrate 30 is fixed to substrate holding area 23 by screwing using screw 32, and a lead wire formed on circuit substrate 30 is connected to connection pieces formed on upper ends of lead plates 35 to electrically connect secondary battery cells 1 and circuit substrate 30.

Figure 9D:
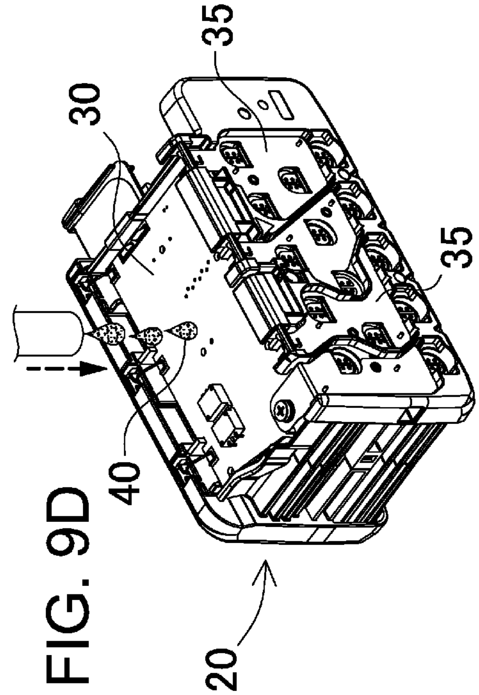
FIG. 9D is a perspective view illustrating a state where potting is performed on the battery holder in FIG. 9C.
Figure 9A:
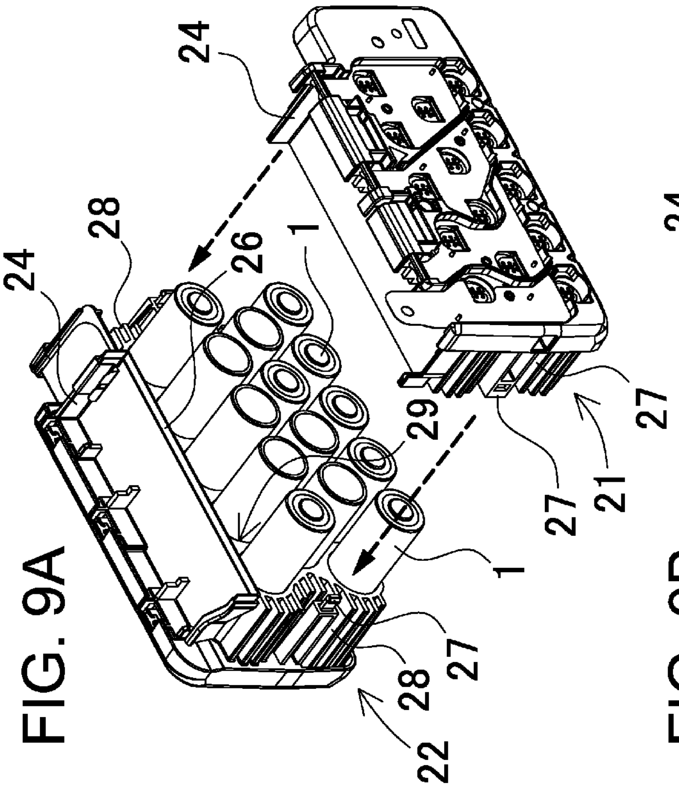
FIG. 9A is an exploded perspective view illustrating a state where secondary battery cells are held by the battery holder of the battery pack according to the first exemplary embodiment.
Figure 9B:
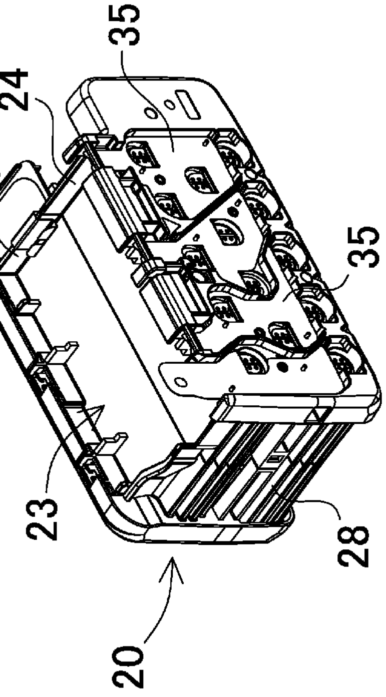
FIG. 9B is a perspective view illustrating the battery holder assembled from the state in FIG. 9A.
Figure 10C:
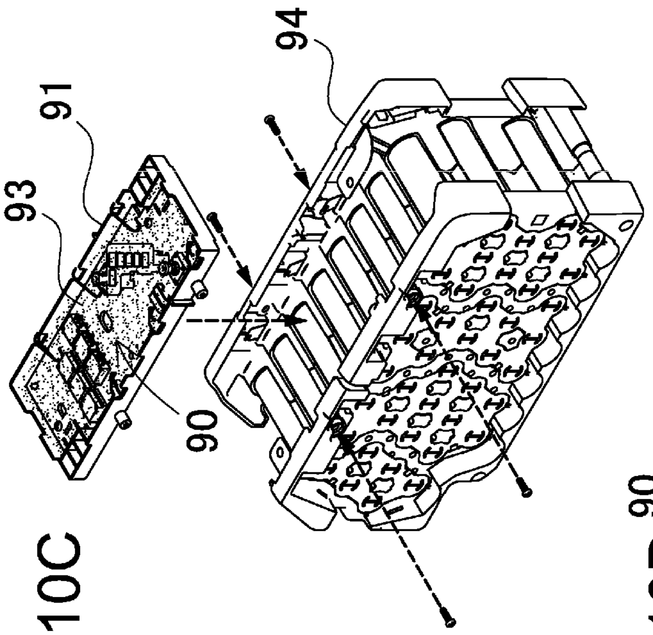
FIG. 10C is an exploded perspective view illustrating a state where the substrate holder in FIG. 10B is fixed to a battery holder.
Figure 10D:
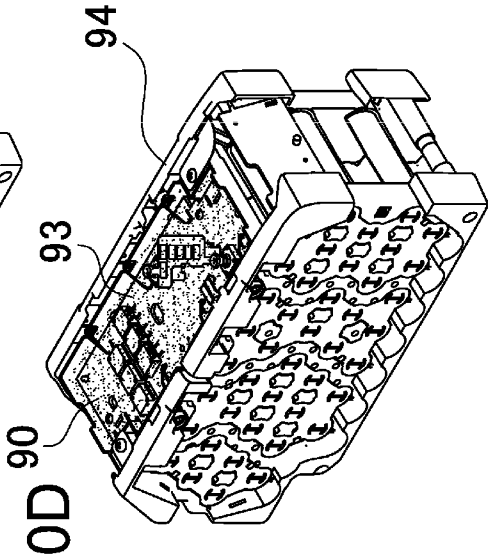
FIG. 10D is a perspective view of the battery pack assembled from the state in FIG. 10C.
Figure 10A:
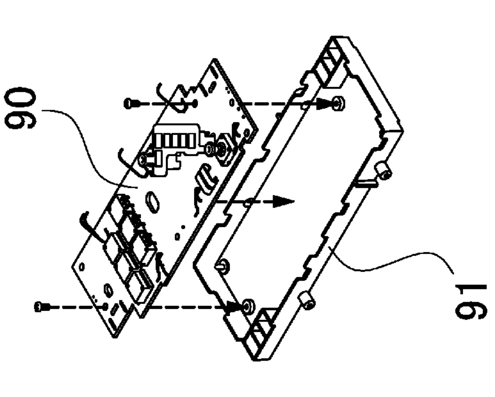
FIG. 10A is an exploded perspective view illustrating a state where a circuit substrate of a conventional battery pack is housed in a substrate holder.
Figure 10B:
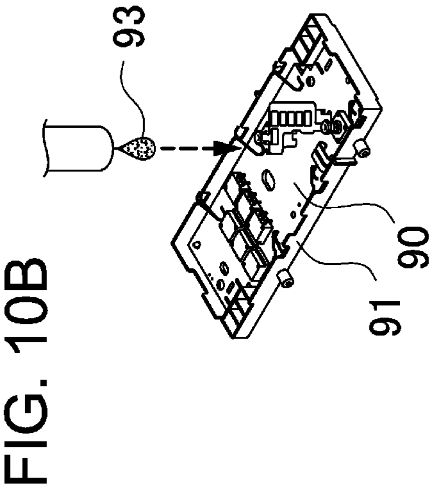
FIG. 10B is a perspective view illustrating a state where potting is performed in the state in FIG. 10A.

When circuit substrate 30 is fixed to substrate holding area 23 in this manner, substrate holding area 23 is filled with potting resin 40 as illustrated in FIG. 9D. At this time, the joint interface between first divided holder 21 and second divided holder 22 is exposed in substrate holding area 23. However, since first divided holder 21 and second divided holder 22 are joined together by the above-described spigot (inlay) structure, it is possible to prevent potting resin 40 from leaking into battery holder 20 from the joint interface.

Battery holder 20 thus obtained is housed in outer case 10 that is divided into upper case 11 and lower case 12 as illustrated in FIG. 4, outer case 10 is fixed, and thus battery pack 100 can be obtained.

As described above, it is possible to simplify a configuration of covering circuit substrate 30 with potting resin 40. In particular, by efficiently radiating the heat generated by the semiconductor element mounted on circuit substrate 30, it is possible to achieve operational stability of the circuit. Furthermore, conventionally, in order to reduce a heat generation amount of the semiconductor element such as the FET, a plurality of semiconductor elements has been connected in parallel to reduce an amount of current per element. However, when sufficient heat radiation is achieved, such a configuration is unnecessary, and it is possible to obtain an effect of reducing an amount of semiconductor elements used. In addition, performing potting on only necessary parts without performing potting on the entire battery including the secondary battery cells makes it possible to reduce a required amount of resin used for potting and to reduce a weight of the battery pack.

INDUSTRIAL APPLICABILITY

The battery pack according to the present invention can be suitably used as a battery pack capable of charging and discharging for a battery-driven device such as a laptop computer, a cellular phone, a portable DVD player, a portable car navigation system, a portable music player, an electric tool, and an assisted bicycle.

The invention claimed is:

1. A battery pack comprising:

a plurality of secondary battery cells connected to each other in series or in parallel;

a battery holder that holds the plurality of secondary battery cells;

a circuit substrate connected to the plurality of secondary battery cells; and an outer case that houses the battery holder inside, wherein the battery holder is divided into a plurality of divided holders, each of the plurality of divided holders forms a fitting structure for fitting the plurality of divided holders to each other at a joint interface where the plurality of divided holders are fitted to each other by the fitting structure of the plurality of divided holders, the battery holder forms a substrate holding area that holds the circuit substrate with the circuit substrate surrounded by side walls in a state where the plurality of divided holders are coupled to each other by the fitting structure, the plurality of divided holders includes a first divided holder and a second divided holder adjacent to each other, the first divided holder has a first edge thereof exposed in the substrate holding area, the second divided holder has a second edge thereof exposed in the substrate holding area, the first edge and the second edge extend along an entire length of the substrate holding area, and directly contact each other along the entire length of the substrate holding area, and a surface of the circuit substrate is covered with a potting resin in the substrate holding area, wherein the first edge and the second edge are directly adjacent to at least one of the circuit substrate and the potting resin disposed in the substrate holding area.

2. The battery pack according to claim 1, wherein the battery holder is made of polycarbonate.

3. The battery pack according to claim 2, wherein the fitting structure is a spigot structure.

4. The battery pack according to claim 3, wherein the fitting structure includes a groove portion that is formed at the joint interface of one of the plurality of divided holders, and an insertion portion that is formed on the joint interface of another of the plurality of divided holders and press-fitted into the groove portion.

5. The battery pack according to claim 4, wherein a pair of sandwiching portions that are separated to form the groove portion are formed to each have a substantially same thickness.

6. The battery pack according to claim 1, wherein the substrate holding area is formed in a rectangular shape in a plan view, and the joint interface between the plurality of divided holders is located along a longitudinal direction of the rectangular shape.

7. The battery pack according to claim 1, wherein the battery holder is divided into two parts at substantially a center.

8. A method for producing a battery pack including a plurality of secondary battery cells connected to each other in series or in parallel, a battery holder that holds the plurality of secondary battery cells, a circuit substrate connected to the plurality of secondary battery cells, and an outer case that houses the battery holder inside, the method comprising:

sandwiching the plurality of secondary battery cells to hold the plurality of secondary battery cells in a state where the battery holder is divided into a plurality of divided holders;

coupling the plurality of divided holders by a fitting structure for fitting the plurality of divided holders to each other to form the battery holder, the fitting structure being formed at an interface for joining the plurality of divided holders together, and forming a substrate holding area that holds the circuit substrate on an upper surface of the battery holder and in which a joint interface where the plurality of divided holders are fitted to each other by the fitting structure of the plurality of divided holders is exposed;

holding the circuit substrate in the substrate holding area with the circuit substrate surrounded by side walls;

covering a surface of the circuit substrate with a potting resin to cure the potting resin in the substrate holding area; and housing the battery holder in the outer case.

9. The battery pack according to claim 1, wherein the fitting structure of the first and second divided holders extends along the entire length of the substrate holding area.

10. The battery pack according to claim 1, wherein the first divided holder has a groove portion along an entirety of the first edge, the second divided holder has an insertion portion along an entirety of the second edge, and the groove portion and the insertion portion fit together over the entire length of the substrate holding area to form the fitting structure.

11. The battery pack according to claim 1, wherein the side walls of the battery holder directly connect to sides of the circuit substrate.

12. The battery pack according to claim 1, wherein the joint interface between the first divided holder and the second divided holder is formed in a substantially U-shape in cross section, and the fitting structure is formed in a substantially U-shape along the joint interface.

13. The battery pack according to claim 1, wherein the fitting structure includes:

a groove portion that is formed at the joint interface of the first divided holder, and an insertion portion that is formed on the joint interface of the second divided holder and press-fitted into the groove portion, wherein the groove portion is formed between a pair of sandwiching portions that are separated from each other at a constant interval on the joint interface of the first divided holder.

14. The battery pack according to claim 1, wherein the fitting structure prevents the potting resin from leaking into the battery holder from the joint interface.

15. The battery pack according to claim 1, free of a substrate holder independent of the substrate holding area formed by the batter holder.

16. The battery pack accordingly to claim 1, further comprising a semiconductor element mounted on the circuit substrate.

17. The battery pack according to claim 16, wherein the semiconductor element comprises a field effect transistor configured as a charging and discharging circuit.

18. The battery pack according to claim 16, wherein the semiconductor element is embedded in the potting resin; and the potting resin is configured to thermally conduct and radiate heat from the semiconductor element.

19. The battery pack accordingly to claim 1, wherein the secondary battery cells are cylindrical.

20. The battery pack accordingly to claim 1, wherein the secondary battery cells are lithium ion cells.

* * * * *